US010668632B2

(12) United States Patent
Lin

(10) Patent No.: US 10,668,632 B2
(45) Date of Patent: Jun. 2, 2020

(54) METHOD FOR EXTERNAL FORCE TO DRIVE MOVING PIECE IN MECHANICAL JOINT

(71) Applicant: SUZHOU AMTF ROBOTS CO., LTD, Suzhou (CN)

(72) Inventor: Zhongwei Lin, Suzhou (CN)

(73) Assignee: SUZHOU AMTF ROBOTS CO., LTD., Suzhou (CN)

(*) Notice: Subject to any disclaimer, the term of this patent is extended or adjusted under 35 U.S.C. 154(b) by 0 days.

(21) Appl. No.: 15/742,591

(22) PCT Filed: Sep. 28, 2016

(86) PCT No.: PCT/CN2016/100692
§ 371 (c)(1),
(2) Date: Apr. 16, 2018

(87) PCT Pub. No.: WO2017/020873
PCT Pub. Date: Feb. 9, 2017

(65) Prior Publication Data
US 2018/0207813 A1    Jul. 26, 2018

(30) Foreign Application Priority Data

Aug. 4, 2015 (CN) .......................... 2015 1 0471069

(51) Int. Cl.
*G05B 11/32* (2006.01)
*B25J 18/04* (2006.01)
(Continued)

(52) U.S. Cl.
CPC ............. *B25J 18/04* (2013.01); *B25J 9/1633* (2013.01); *B25J 9/1651* (2013.01); *B25J 13/085* (2013.01);
(Continued)

(58) Field of Classification Search
CPC ...... B25J 13/085; B25J 18/04; B25J 19/0029; B25J 9/1633; B25J 9/1651; G05B 2219/39325
(Continued)

(56) References Cited

U.S. PATENT DOCUMENTS

2006/0180647 A1* 8/2006 Hansen ..................... B60S 3/00
235/375
2012/0262093 A1* 10/2012 Recker ............... H05B 33/0854
315/308
(Continued)

FOREIGN PATENT DOCUMENTS

CN    103025492    4/2013
CN    104162890    11/2014
(Continued)

*Primary Examiner* — Bickey Dhakal
*Assistant Examiner* — Gabriel Agared
(74) *Attorney, Agent, or Firm* — Law Offices of Steven W. Weinrieb

(57) ABSTRACT

A method for an external force to drive a moving piece in a mechanical joint. The joint comprises a stationary piece, a moving piece, and a driving mechanism. The driving mechanism comprises a servomotor, a driver, and an encoder. The servomotor is connected to the moving piece. When the joint is stationary, the servomotor is in a torque mode and outputs a resistance-reducing torque having a direction which changes with time. An external force is used to drive the moving piece so that the moving piece moves with respect to the stationary piece. The driver determines the movement direction of the moving piece according to an output of the encoder. If the moving piece is moving in a positive direction with respect to the stationary piece, the servomotor is controlled to stop outputting the resistance-reducing torque or to output an assistance torque enabling the moving piece to have a positive directional movement trend. If the moving piece is moving in reverse with respect to the stationary (Continued)

piece, the servomotor is controlled so as to stop outputting the resistance-reducing torque or to output an assistance torque enabling the moving piece to have a reverse movement trend.

8 Claims, 6 Drawing Sheets

(51) Int. Cl.
  *B25J 9/16* (2006.01)
  *B25J 13/08* (2006.01)
  *B25J 19/00* (2006.01)

(52) U.S. Cl.
  CPC . *B25J 19/0029* (2013.01); *G05B 2219/39325* (2013.01)

(58) Field of Classification Search
  USPC .......................................................... 318/625
  See application file for complete search history.

(56) References Cited

U.S. PATENT DOCUMENTS

| | | | |
|---|---|---|---|
| 2013/0278196 A1 | 10/2013 | Tian | |
| 2017/0331177 A1* | 11/2017 | MacCallum | B64B 1/48 |
| 2018/0048149 A1* | 2/2018 | Testani | G05F 1/00 |
| 2018/0058463 A1* | 3/2018 | Rollins | F04D 25/0606 |

FOREIGN PATENT DOCUMENTS

| | | |
|---|---|---|
| CN | 204471402 | 7/2015 |
| CN | 105058411 | 11/2015 |
| JP | 1011121 | 1/1998 |

* cited by examiner

METHOD FOR EXTERNAL FORCE TO DRIVE MOVING PIECE IN MECHANICAL JOINT

CROSS REFERENCE TO RELATED APPLICATIONS

This application claims priority to the following Patent Applications: (1) PCT application PCT/CN2016/100692, entitled "METHOD FOR EXTERNAL FORCE TO DRIVE MOVING PIECE IN MECHANICAL JOINT" filed Sep. 28, 2016; and (2) Chinese patent application CN 201510471069.7, filed Aug. 4, 2015; the above-identified applications are hereby incorporated by reference in entirety as if fully set forth herein.

BACKGROUND

1. Technical Field

The invention relates to a method for an external force to drive a moving piece in a mechanical joint.

2. Description of Related Art

A mechanical joint comprises a stationary piece, a moving piece and a driving mechanism driving the moving piece to move with respect to the stationary piece; and the driving mechanism generally comprises an electromotor, and an output shaft of the electromotor is directly connected to the moving piece, or is indirectly connected with the moving piece through a transmission mechanism (such as a decelerator). The electromotor moves to directly drive the moving piece or drive the moving piece through the transmission mechanism to move with respect to the stationary piece, so as to realize the movement of the joint.

The modern industrial robot generally has one mechanical joint at least, and the mechanical joint moves repeatedly through the electromotor. However, for some special purposes, such as the realization of the demonstration of the robot, the moving piece needs to be operated manually with respect to the stationary piece.

However, the resistances of a bearing and an oil seal for sealing throughout the electromotor and the transmission mechanism (such as a decelerator) and various reasons including a magnetic resistance of the electromotor and a pre-tightening force which may possibly exist throughout the electromotor and the transmission mechanism (such as a decelerator) cause the mechanical joint itself to have a systemic resistance r. In addition, since the electromotor drives the moving piece to conduct decelerated movement through the decelerator, assuming that the deceleration ratio is i, then the resistance needs to be overcame to drive the moving piece will be amplified by i times, when the moving piece moves with respect to the stationary piece manually, a very large strength is needed to make the moving piece move, or the moving piece cannot move depending on the human power only, especially when the mechanical joint is a large-scale mechanical joint or a mechanical joint with very large power.

SUMMARY

The object of the present invention is to provide a method for an external force to drive a moving piece in a mechanical joint that the moving piece in the mechanical joint can be driven by less force.

Regarding to the method for an external force to drive a moving piece in a mechanical joint according to the present invention, the joint comprises a stationary piece, the moving piece and a driving mechanism driving the moving piece to move with respect to the stationary piece; the driving mechanism, comprises a servomotor, and a driver and an encoder electrically connected to the servomotor to control the servomotor; and an output shaft of the servomotor is connected to the moving piece; and the method for an external force to drive a moving piece in a mechanical joint is as follows:

a. when the mechanical joint is in a stationary state, the servomotor is in a torque mode, and the servomotor outputs a resistance-reducing torque having a direction which changes with time through the driver, so feat the moving piece has a positive direction movement trend or a negative direction movement trend with respect to the stationary piece, and the positive direction and the negative direction of the movement trend are changed with time;

b. the external force is used to drive the moving piece, so that the moving piece moves with respect to the stationary piece; the driver determines the movement direction of the moving piece according to an output of the encoder; if the moving piece is moving in a positive direction with respect to the stationary piece, the servomotor is controlled through the driver to stop outputting the resistance-reducing torque or output an assistance torque enabling the moving piece to have a positive direction movement trend; if the moving piece is moving in reverse with respect to the stationary piece, the servomotor is controlled through the driver to stop outputting the resistance-reducing torque or output an assistance torque enabling the moving piece to have a reverse movement tend.

The beneficial effect of the prevent invention is that: the servomotor outputs the resistance-reducing torque having a direction which changes with time, so that the direction of the movement trend of the moving piece with respect to the stationary piece is also changed repeatedly. When the movement direction of the moving piece under the external force is the same as the direction of the movement trend of the moving piece under the resistance-reducing torque, only a less external force is needed to realize the movement of the moving piece. Before the moving piece starts to move, a static friction is formed between various parts of the mechanical joint; after the moving piece starts to move, a dynamical friction is formed between various parts of the mechanical joint; and since the static friction is larger than the dynamical friction, the external force needs to keep the movement of the moving piece is less than the force needs to move the moving piece. Therefore, after the moving piece starts to move, although the servomotor stops outputting the resistance-reducing torque, less external force is stilled needed to enable the moving piece to keep the movement. Of course, if the servomotor outputs the assistance torque after the movement of the moving piece, since the assistance torque enables the direction of the movement trend of the moving piece to be the same as the movement direction of the moving piece, the external force needed to keep the movement of the moving piece can be further reduced.

Regarding to the method for an external force to drive a moving piece in a mechanical joint, in step a, the servomotor outputs the resistance-reducing torque having a direction and a strength which change with time through the driver.

Regarding to the method for an external force to drive a moving piece in a mechanical joint, in step b, no matter the moving piece is moving in a positive direction or a negative direction with respect to the stationary piece, the servomotor is controlled through the driver to output the assistance torque, and the strength of the assistance torque is equal to or less than the value of the resistance-reducing torque when the moving piece starts to move with respect to the stationary piece.

Regarding to the method for an external force to drive a moving piece in a mechanical joint, in step a, the servomotor outputs the resistance-reducing torque having a direction and strength which continuously change with time through the driver.

Regarding to the method for an external force to drive a moving piece in a mechanical joint, the driving mechanism further comprises a transmission mechanism, a power input piece of the transmission mechanism is connected to the output shall of the servomotor, and a power output piece of the transmission mechanism is connected to the moving piece. The transmission mechanism comprises a decelerator, the output shaft of the servomotor is connected to a power input piece of the decelerator, and a power output piece of the decelerator is connected to the moving piece. The decelerator is a cycloidal-pin gear decelerator.

Regarding to the method for an external force to drive a moving piece in a mechanical joint, the external force is a hand power.

Regarding to the method for an external force to drive a moving piece in a mechanical joint, the maximum value of the resistance-reducing torque in step a is the maximum value that enables the moving piece to have a positive direction movement trend or a negative direction movement trend with respect to the stationary piece without moving.

Regarding to the method for an external force to drive a moving piece in a mechanical joint, steps a and b are conducted on the basis that the servomotor outputs a balance torque which keeps the mechanical joint in a balance status; in other words, an output torque of the servomotor in step a is a combination torque of the balance torque and the resistance-reducing torque, and the output torque of the servomotor in step b is a balance torque or a combination torque of the balance torque and the assistance torque.

The balance torque is the torque of the mechanical joint loaded for keeping a balance status. For example; when the moving piece in the mechanical joint moves in a vertical plane with respect to the stationary piece, in order to prevent the moving piece from moving with respect to the stationary piece under the effect of gravity, a balance torque is generally loaded to the moving piece through the servomotor, the direction of the balance torque is opposite to the direction of the torque generated by the gravity, the strength is basically the same, and then the balance torque is in balance with the torque generated by the gravity (the algebraic addition of them is zero), so as to prevent the moving piece from moving in the vertical plane under the gravity. When the moving piece hi the mechanical Joint moves in a horizontal plane with respect to the stationary piece, since the gravity cannot affect the movement of the moving piece on the horizontal plane, the servomotor generally does not need to output the balance torque, or the balance torque outputted by the servomotor is zero.

Regarding to the technology, steps a and b are conducted on the basis that the servomotor outputs the balance torque. That is to say, in step a, the servomotor not only outputs the balance torque, but also outputs the resistance-reducing torque. In other words, the final output torque of the servomotor is the combination torque of the balance torque and the resistance-reducing torque. In step b, the servomotor stops outputting the resistance-reducing torque or the assistant torque while outputting the balance torque; in other words, step b has two statuses, one status is that the final output torque of the servomotor is the balance torque, and another status is that the final output torque of the servomotor is the combination torque of the balance torque and the assistance torque.

DETAILED DESCRIPTION

Embodiment 1

Figure 1:
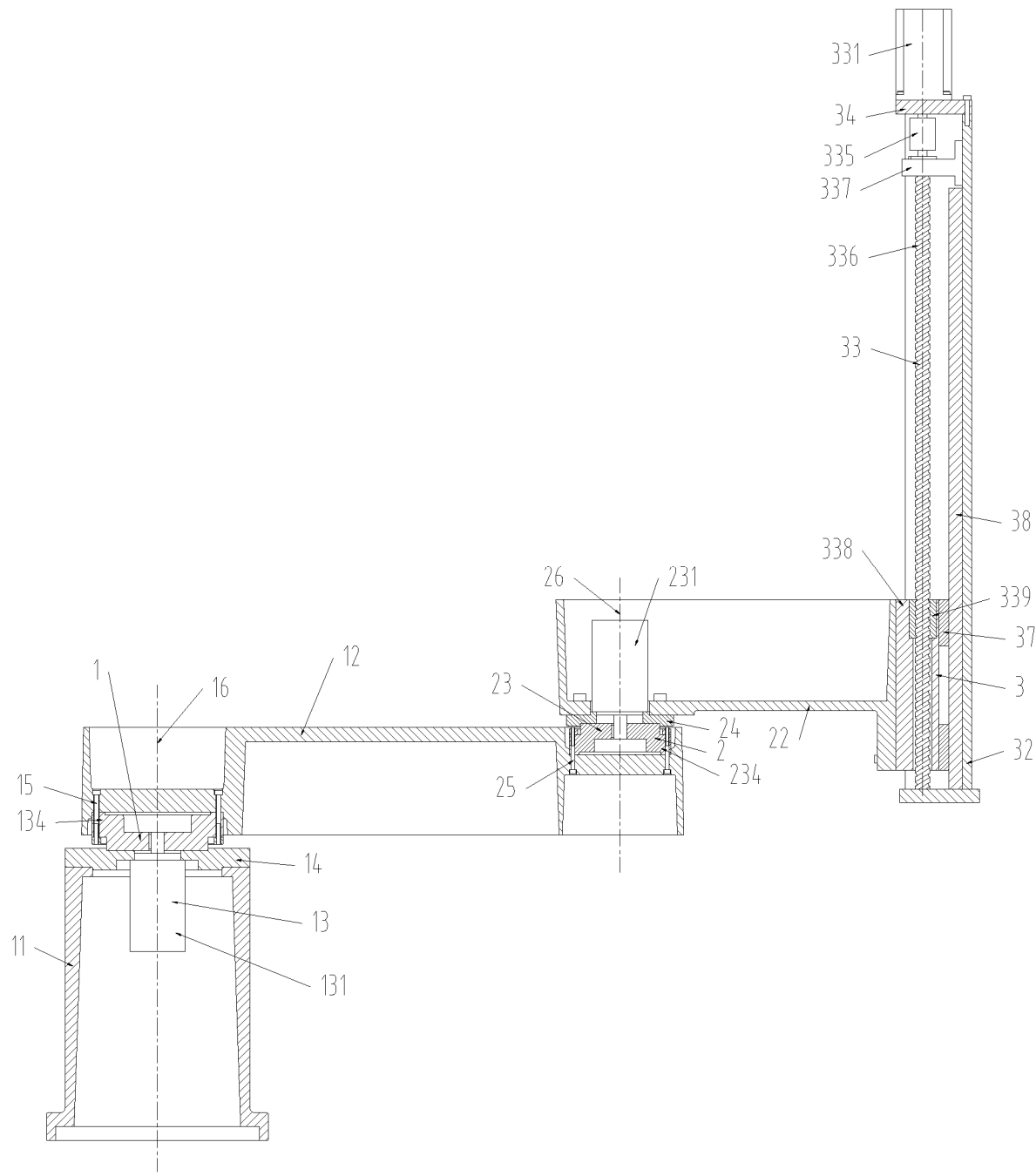
FIG. 1 is a structure diagram of a joint of a robot.

A robot as shown in FIG. 1 comprises three joints 1 to 3.

The joint 1 comprises a fixing base used as an arm 11, an arm 12, a driving mechanism 13 driving the arm 12 to rotate with respect to the fixing base, a flange plate 14, etc. The driving mechanism 13 comprises a servomotor 131, a driver 132 electrically connected to the servomotor to control the servomotor, an encoder 133 connected to the servomotor 131, and a decelerator 134. The flange plate 14 is fixed on the arm (fixing base) 11, and shells of the servomotor 131 and the decelerator 134 are both fixed on the flange plate 14. An input shaft of the decelerator 134 is connected to an output shaft of the servomotor 131; and an output shaft of the decelerator 134 is connected to the arm 12 through a bolt 15. The servomotor 131 moves to drive the arm 12 to rotate in a horizontal plane around an axis 16 with respect to the fixing base 11 through the decelerator 134. Regarding to the joint 1, the arm 11 is a stationary piece, and the arm 12 is a moving piece. A balance torque n11 outputted by the servomotor 131 is zero.

The joint 2 comprises the arm 12, an arm 22, a driving mechanism 23 driving the arm 12 and the arm 22 to relatively rotate, and a flange plate 24, etc. The driving mechanism 23 comprises a servomotor 231, a driver 232 electrically connected to the servomotor to control the servomotor, an encoder 233 connected to the servomotor 231, and a accelerator 234. The flange plate 24 is fixed on the arm 22, and shells of the servomotor 231 and the decelerate 234 are both fixed on the flange plate 24. An input shaft of the decelerate 234 is connected to an output shaft of the servomotor 231; and an output shaft of the decelerator 234 is connected to the arm 12 through a bolt 25. The servomotor 231 moves to drive the arm 22 to rotate in a horizontal plane around an axis 26 with respect to the fixing base 12 through the decelerator 234. Regarding to the joint 2, the arm 12 is a stationary piece, and the arm 22 is a moving piece. A balance torque n21 outputted by the servomotor 231 is zero.

The joint 3 comprises the arm 22, an arm 32, a driving mechanism 33 driving the arm 32 to move up and down with respect to the arm 22, an electromotor support 34, a wire rail, etc. The driving mechanism 33 comprises a servomotor 331, a driver 332 electrically connected to the servomotor to control the servomotor, an encoder 333 connected to the servomotor 331, a coupler 335, a nut screw rod mechanism, etc. The nut screw rod mechanism comprises a lead screw 336 rotationally arranged on a lead screw base 337, a sliding block base 338 fixed on the arm 22, a nut 339 matched with the lead screw and fixed on the sliding block base 338, etc. The wire rail comprises a wire rail sliding block 37 arranged on the sliding block base and a guide rail 38 coordinated with the wire rail sliding block to slide op and down. Both the electromotor support 34 and the lead screw base are fixed on the arm 32, and the arm 32 is fixed with the guide rail. The servomotor 331 moves to drive the lead screw to rotate through the coupler, and since the nut is fixed on the arm 22 though the sliding block base, the lead screw moves up and down with respect to the nut while rotating. When the lead screw moves up and down, the lead screw base, the servomotor 333, the arm 32, the guide rail, etc. move up and down together with respect to the sliding block base (and the arm 22). The wire rail is arranged between the sliding block base and the arm 32, and plays a guiding role to the up-and-down movement of the arm. Regarding to the joint 2, the arm 22 is a stationary piece, and the arm 32 is a moving piece. In order to prevent the arm 32, the servomotor 331, the coupler 335, etc. from enabling the arm 32 to downwardly move with respect to the arm 22 due to the gravity, the servomotor 331 needs to output the balance torque n31 to offset the torque caused by the gravity of the arm 32, the servomotor 331, the coupler 335 and other parts, so as to prevent the arm 32, etc. from moving up and down under the gravity.

Figure 2:
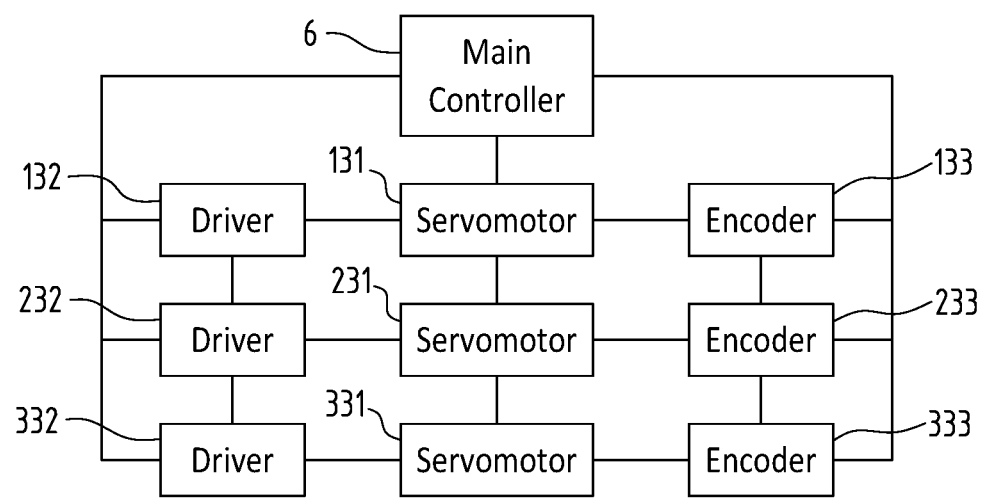
FIG. 2 is a functional block diagram of a master controller and a servomotor of the robot.

With reference to FIG. 2, a main controller 6 is electrically connected to various drivers 132, 232 and 332, and the output of various encoders 133, 233 and 333 is connected to the main controller.

A method for a hand force to drive a moving piece in a mechanical joint is as follows:

a. when various mechanical joints of the robot are in the stationary status, various servomotors are in a torque mode through various drives, and assuming that the servomotors 131, 231 and 331 output the resistance-reducing torques n12, n22 and n32 having a strength and a direction which continuously change with time according to a sine rule while outputting the balance torque, the period of the resistance-reducing torques is 0.2 s. That is to say, the final output torque of the servomotors 131, 231 and 331 is the combination torque of the balance torques n11, n21 and n31, and the resistance-reducing torques n12, n22 and n32. The maximum value of the resistance-reducing torque n12 is the maximum value that enables the arm 22 to have an anticlockwise movement trend (or a clockwise movement trend) with respect to the arm 12 without moving. The maximum value of the resistance-reducing torque n22 is the maximum value that enables the arm 12 to have an anticlockwise movement trend (or a clockwise movement trend) with respect to the arm 12 without moving. The maximum value of the resistance-reducing torque n32 is the maximum value that enables the arm 32 to have a downward movement trend with respect to the arm 22 without moving.

Figure 3:
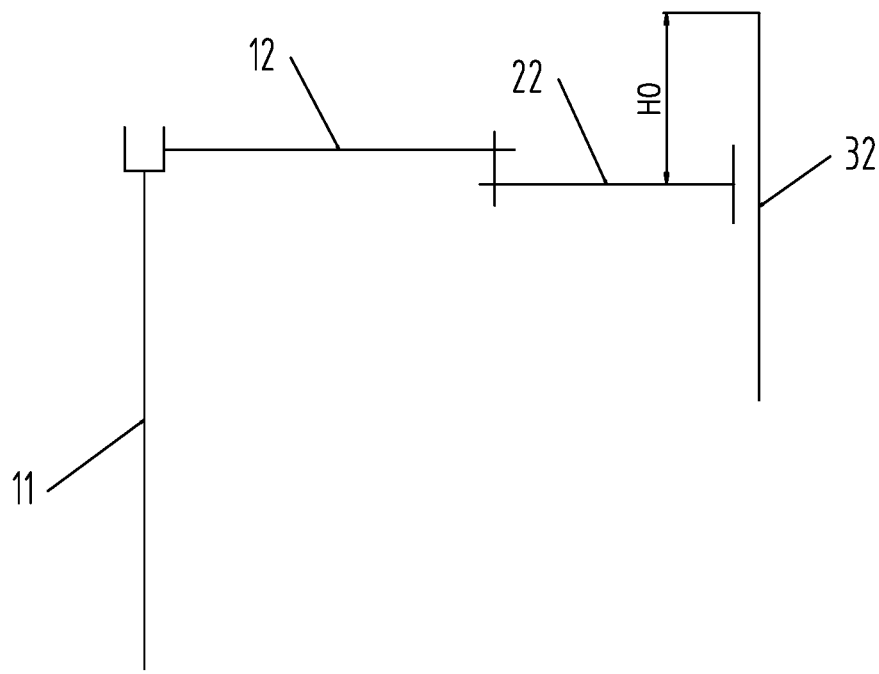
FIG. 3 is a schematic diagram of the joint of the robot when timekeeping is started (the robot is not in a movement)
Figure 4:
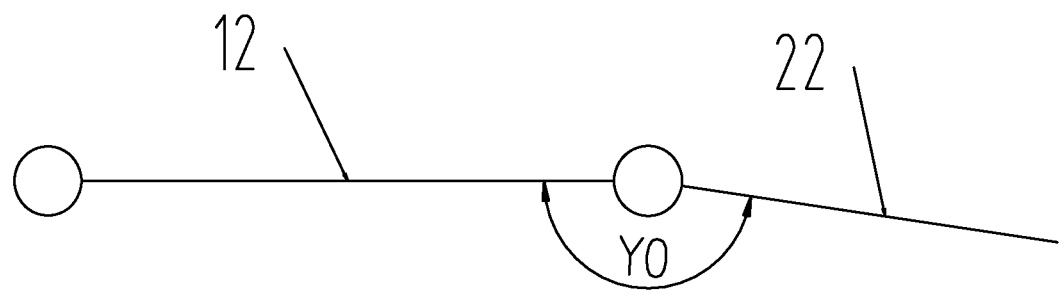
FIG. 4 is a top schematic diagram of joints 1 and 2 when the timekeeping is started (the robot is not in a movement)
Figure 5:
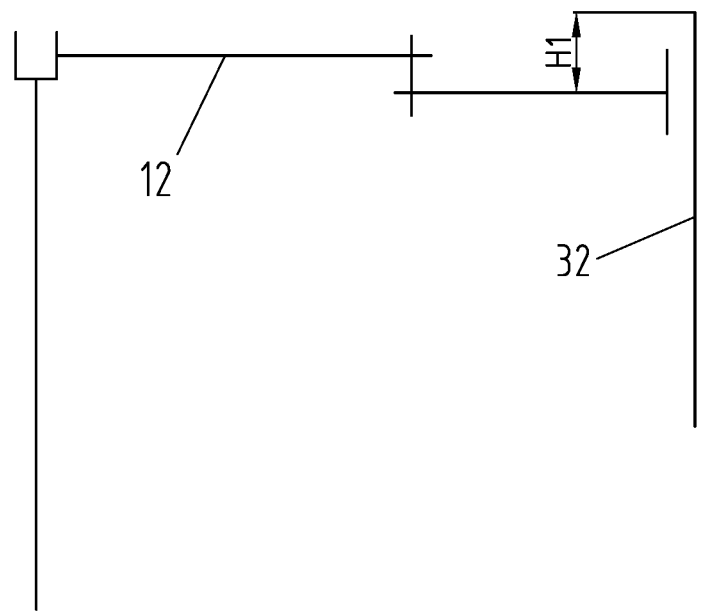
FIG. 5 is a schematic diagram of the joint of the robot after the movement of the robot.
Figure 6:
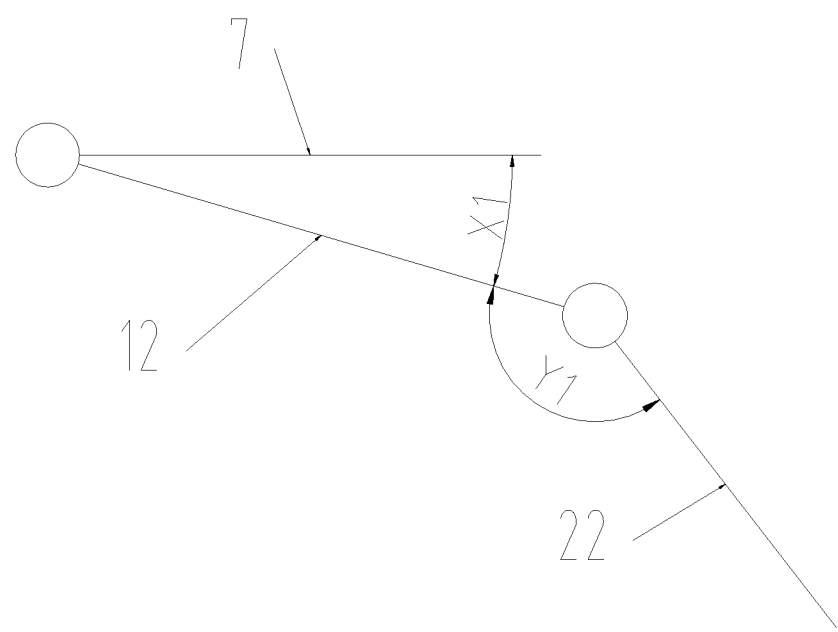
FIG. 6 is a top schematic diagram of the joints 1 and 2 after the movement of the robot.

Since the direction of the resistance-reducing torque n12 changes with time, the arm 12 has an anticlockwise rotation trend and a clockwise rotation trend alternatively changed in a horizontal plane with respect to the arm 11. Since the direction of the resistance-reducing torque n22 changes with time, the arm 22 has an anticlockwise rotation trend and a clockwise rotation trend alternatively changed in a horizontal plane with respect to the arm 12; and since the direction of the resistance-reducing torque n32 changes with time, the arm 32 has an upward movement trend and a downward movement trend alternatively changed in a vertical plane with respect to the arm 22. The robot, is in a stationary status.

b. When the arm 32 of the robot is driven manually, the timekeeping is started, and the main controller records the output value of the encoder at each moment at an interval of 0.01 s. With reference to FIGS. 3 and 4, in a period before 0 s to 0.53 s when the timekeeping is started, the included angle formed between the arm 12 and the vertical plane 7 is 0 s, the included angle formed between the arm 22 and the arm 12 in the horizontal plane is Y0, and the height of the top end of the arm 32 that is higher than the horizontal plane where the arm 22 is located in is H0. With reference to FIGS. 5 and 6, the included angle formed between the arm 11 and the vertical plane 7 is X1, the included angle formed between the arm 22 and the arm 12 in the horizontal plane is Y1, and the height of the top end of the arm 32 that is higher than the horizontal plane where the arm 22 is located in is H1. That is to say, the joints 1, 2 and 3 start to move (refer to that two arms in some joint move relatively) at 0.53 s.

Regarding to the joint 1, the main controller makes a judgment according to the output value of the encoder 133 at 0.53 s, and the arm 12 rotates in clockwise direction with respect to the vertical plane 7. The main controller controls the servomotor 131 through the driver 132 to enable the servomotor 131 to stop outputting the resistance-reducing torque n12 from 0.53 s (but the balance torque is continuously outputted), and outputs the assistance torque n13 which enables the arm 12 to have a clockwise rotation trend in a horizontal plane with respect to the arm 11, so as to realize the assistance to the manually operated robot. The strength of the assistance torque n13 can foe equal to or less than the maximum value of the resistance-reducing torque n12 changed according to a sine rule before 0.53 s, Since the balance torque n11 (although the torque is zero) always exists in steps a and b, that is to say, the servomotor 131 starts from 0.53 s and the final output torque of the servomotor 131 is the combination torque of the balance torque n11 and the assistance torque n13. However, before 0.53 s, the final output torque of the servomotor 131 is the combination torque of the balance torque n11 and the resistance-reducing torque n12.

Regarding to the joint 2, the main controller makes a judgment according to the output value of the encoder 133 at 0.53 s, and the arm 22 rotates in clockwise direction with respect to the arm 12. The main controller controls the servomotor 231 through the driver 232 to enable the servomotor 231 to stop outputting the resistance-reducing torque n22 from 0.53 s (but the balance torque is continuously outputted), and outputs the assistance torque n23 which enables the arm 22 to have a clockwise rotation trend in a horizontal plane with respect to the arm 12, so as to realize the assistance to the manually operated robot. The strength of the assistance torque n23 can be equal to or less than the maximum value of the resistance-reducing torque n22 changed according to a sine rule before 0.53 s. Since the balance torque n21 (although the torque is zero) always exists in steps a and b, that is to say, the servomotor 231 starts from 0.53 s, and the final output torque of the servomotor 231 is the combination torque of the balance torque n21 and the assistance torque n23. However, before 0.53 s, the final output torque of the servomotor 231 is the combination torque of the balance torque n11 and the resistance-reducing torque n22.

Regarding to the joint 3, the main controller makes a judgment according to the output value of the encoder 133 at 0.53 s, and the position of the arm 32 is lowered with respect to the arm 22. The main controller controls the servomotor 331 through the driver 332 to enable the servomotor 331 to stop outputting the resistance-reducing torque n32 from 0.53 s (but the balance torque is continuously outputted), and outputs the assistance torque n33 which enables the arm 32 to have a downward movement trend in a vertical plane with respect to the arm 22, so as to realize the assistance to the manually operated robot. The strength of the assistance torque n33 can be equal to or less than the maximum value of the resistance-reducing torque n32 changed according to a sine rule before 0.53 s. Since the balance torque n31 (although the torque is zero) always exists in steps a and b, that is to say, the servomotor 331 starts from 0.53 s, and the final output torque of the servomotor 331 is the combination torque of the balance torque n31 and the assistance torque n33. However, before 0.53 s, the final output torque of the servomotor 331 is the combination torque of the balance torque n31 and the resistance-reducing torque n32.

Embodiment 2

Figure 7:
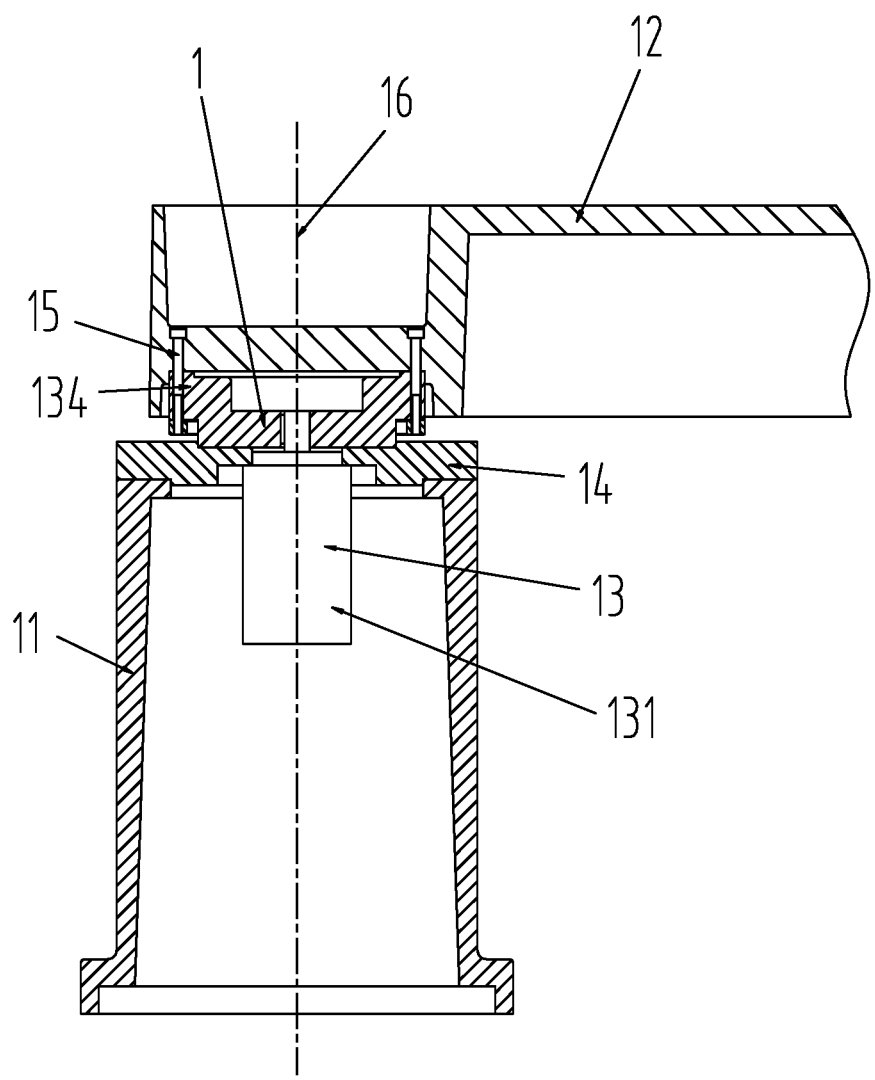
FIG. 7 is a structure diagram of a mechanical joint.
Figure 8:
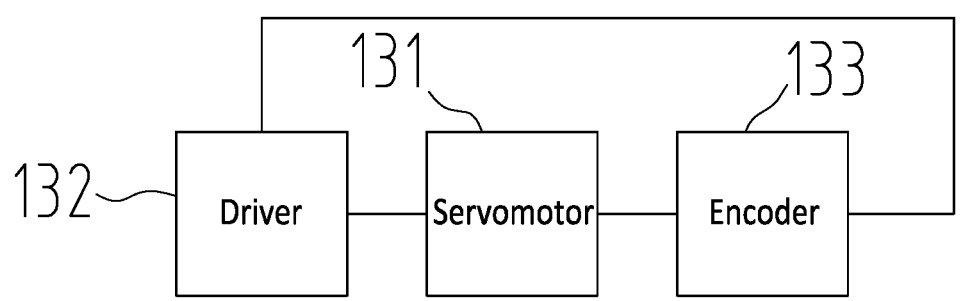
FIG. 8 is a functional block diagram of a the servomotor of the mechanical joint.

With reference to FIGS. 7 and 8, a joint 1 comprises a fixing base used as an arm 11, an arm 12, a driving mechanism 13 driving the arm 12 to rotate with respect to the fixing base, a flange plate 14, etc. The driving mechanism 13 comprises a servomotor 131, a driver 132 electrically connected to the servomotor to control the servomotor, an encoder 131 connected to the servomotor 133, and a decelerator 134. The output of the encoder 133 is connected to the driver. The flange plate 14 is fixed on the arm (fixing base), 11 and shells of the servomotor 131 and the decelerate 134 are both fixed on the flange plate 14. An input shaft of the decelerate 134 is connected to an output shaft of the servomotor 131; and an output shaft of the decelerator 134 is connected to the arm 12 through a bolt 15. The servomotor 131 moves to drive the arm 12 to rotate in a horizontal plane around an axis 16 with respect to the fixing base 11 through the decelerator 134. The arm 11 is a stationary piece and the arm 12 is a moving piece. Since a balance torque outputted by the servomotor 131 is zero, the balance torque is no longer considered.

Figure 9:
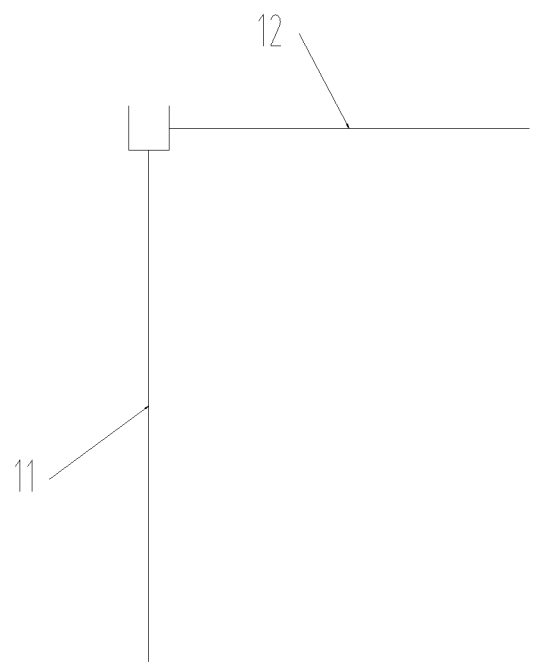
FIG. 9 is a schematic diagram of the joint of the robot when the timekeeping is started (the robot is not in a movement)
Figure 10:
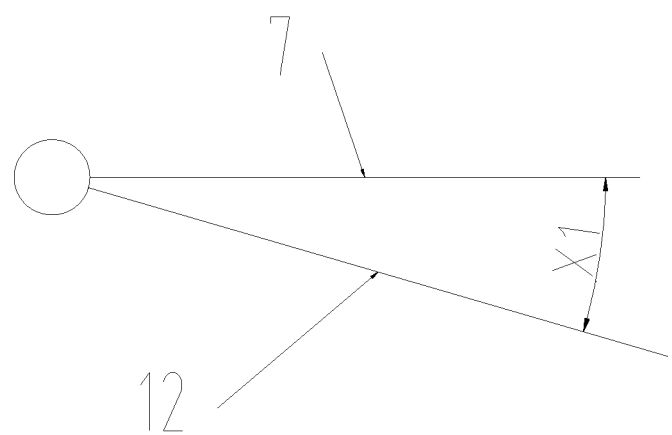
FIG. 10 is a top schematic diagram after the movement of the mechanical joint.

A method for a hand force to drive a moving piece in a mechanical joint is as follows:

a. The driver enables the servomotor to be in a torque mode, and assuming that the servomotor 131 outputs a resistance-reducing torque n12 having a strength and a direction which continuously change with time according to a cosine rule, and the period thereof is 0.4 s. Since the direction of the resistance-reducing torque n12 changes with time, the arm 12 has an anticlockwise rotation trend and a clockwise rotation trend alternatively changed in a horizontal plane with respect to the arm 11. The joint is in a stationary status.

b. When the arm 12 is driven manually, the timekeeping is started, and the driver records the output value of the encoder at each moment at an interval of 0.01 s. With reference to FIG. 9, in a period before 0 s to 2.40 s when the timekeeping is started, the included angle formed between the arm 12 and a vertical plane 7 is 0. With reference to FIG. 10, the included angle formed between the arm 12 and the vertical plane 7 at 2.40 s is X1. That is to say, the joint 1 starts to move at 2.40 s.

The driver makes a judgment at 2.40 s according to the encoder 133, and the arm 12 rotates in clockwise direction with respect to the vertical plane 7. The driver 132 controls the servomotor 131 to enable the servomotor 131 to stop outputting the resistance-reducing torque n12 from 2.40 s, and outputs the assistance torque n13 which enables the arm 12 to have a clockwise rotation trend in a horizontal plane with respect to the arm 11, so as to realize the assistance to the manually operated robot. The strength of the assistance torque n13 is equal to the maximum value of the resistance-reducing torque n12 changed, according to a cosine rule before 2.40 s. That is to say, the servomotor 131 starts from 2.40 s, and the servomotor 131 outputs the assistance torque n13. However, the servomotor 131 outputs the resistance-reducing torque before 2.40 s.

What is claimed is:

1. A method for an external force to drive a moving piece in a mechanical joint, wherein the joint comprises a stationary piece, the moving piece, and a driving mechanism driving the moving piece to move with respect to the stationary piece; the driving mechanism comprises a servomotor, and a driver, and an encoder electrically connected to the servomotor to control the servomotor; and an output shaft of the servomotor is connected to the moving piece; and wherein, the method for an external force to drive a moving piece in a mechanical joint is as follows:

a. when the mechanical joint is in a stationary state, the servomotor is in a torque mode, and the servomotor outputs a resistance-reducing torque having a direction which changes with time through the driver, so that the moving piece has a positive direction movement trend or a negative direction movement trend with respect to the stationary piece, and the positive direction and the negative direction of the movement trend are changed with time;

b. the external force is used to drive the moving piece, so that the moving piece moves with respect to the stationary piece; the driver determines the movement direction of the moving piece according to an output of the encoder; if the moving piece is moving in a positive direction with respect to the stationary piece, the servomotor is controlled through the driver to stop outputting the resistance-reducing torque or output an assistance torque enabling the moving piece to have a positive direction movement trend; if the moving piece is moving in reverse with respect to the stationary piece, the servomotor is controlled through the driver to stop outputting the resistance-reducing torque or output an assistance torque enabling the moving piece to have a reverse movement trend;

wherein, in step a., the servomotor outputs the resistance-reducing torque having a direction and a strength which changes with time through the driver;

wherein, in step b., no matter the moving piece is moving in a positive direction or a negative direction with respect to the stationary piece, the servomotor is controlled through the driver to output the assistance torque, and the strength of the assistance torque is equal to or less than the value of the resistance-reducing torque when the moving piece starts to move with respect to the stationary piece.

2. The method for the external force to drive the moving piece in the mechanical joint according to claim 1, wherein, in step a., the servomotor outputs the resistance-reducing torque having a direction and strength which continuously changes with time through the driver.

3. The method for the external force to drive the moving piece in the mechanical joint according to claim 1, wherein the driving mechanism further comprises a transmission mechanism, a power input piece of the transmission mechanism is connected to the output shaft of the servomotor, and a power output piece of the transmission mechanism is connected to the moving piece.

4. The method for the external force to drive the moving piece in the mechanical joint according to claim 3, wherein the transmission mechanism comprises a decelerator, the output shaft of the servomotor is connected to a power input piece of the decelerator, and a power output piece of the decelerator is connected to the moving piece.

5. The method for the external force to drive the moving piece in the mechanical joint according to claim 4, wherein the decelerator is a cycloidal-pin gear decelerator.

6. The method for the external force to drive the moving piece in the mechanical joint according method for an external force to drive a moving piece in a mechanical joint according to claim 1, wherein the external force is a hand power.

7. The method for the external force to drive the moving piece in the mechanical joint according method for an external force to drive a moving piece in a mechanical joint according to claim 1, wherein the maximum value of the resistance-reducing torque in step a. is the maximum value that enables the moving piece to have a positive direction movement trend or a negative direction movement trend with respect to the stationary piece.

8. The method for the external force to drive the moving piece in the mechanical joint according to claim 1, wherein steps a. and b. are conducted on the basis that the servomotor outputs a balance torque which keeps the mechanical joint in a balance status; in other words, an output torque of the servomotor in step a. is a combination torque of the balance torque and the resistance-reducing torque, and the output torque of servomotor in step b. is a balance torque or a combination torque of the balance torque and the assistance torque.

* * * * *